US009484562B2

(12) United States Patent
Utley et al.

(10) Patent No.: US 9,484,562 B2
(45) Date of Patent: Nov. 1, 2016

(54) TRACTION BATTERY ASSEMBLY

(71) Applicant: FORD GLOBAL TECHNOLOGIES, LLC, Dearborn, MI (US)

(72) Inventors: Brian Utley, Canton, MI (US); Patrick Daniel Maguire, Ann Arbor, MI (US); Sai K. Perumalla, Rochester Hills, MI (US); Steven Droste, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 14/226,984

(22) Filed: Mar. 27, 2014

(65) Prior Publication Data

US 2015/0280183 A1 Oct. 1, 2015

(51) Int. Cl.
*H01M 2/10* (2006.01)
(52) U.S. Cl.
CPC ......... *H01M 2/1077* (2013.01); *H01M 2/1016* (2013.01); *H01M 2/1061* (2013.01); *H01M 2220/20* (2013.01)

(58) Field of Classification Search
None
See application file for complete search history.

(56) References Cited

U.S. PATENT DOCUMENTS

| 4,754,827 A | * | 7/1988 | Hirabayashi | ........ | H01M 2/1083 |
| | | | | | 180/68.5 |
| 2007/0059582 A1 | * | 3/2007 | Leonida | .............. | H01M 8/0206 |
| | | | | | 429/482 |
| 2009/0181288 A1 | * | 7/2009 | Sato | .................... | H01M 2/1077 |
| | | | | | 429/57 |
| 2011/0023361 A1 | * | 2/2011 | Storey | .................... | A01G 31/02 |
| | | | | | 47/62 R |
| 2011/0165451 A1 | * | 7/2011 | Kim | ..................... | H01M 2/1077 |
| | | | | | 429/153 |
| 2011/0269008 A1 | * | 11/2011 | Houchin-Miller | .. | B60L 11/1874 |
| | | | | | 429/120 |
| 2012/0196168 A1 | | 8/2012 | Hirsch et al. | | |
| 2012/0263988 A1 | * | 10/2012 | Obasih | ................ | H01M 10/625 |
| | | | | | 429/98 |
| 2013/0095360 A1 | * | 4/2013 | Niedzwiecki | ....... | H01M 2/1077 |
| | | | | | 429/99 |
| 2013/0146373 A1 | * | 6/2013 | Kosaki | ...................... | B60K 1/04 |
| | | | | | 180/65.1 |
| 2013/0288094 A1 | * | 10/2013 | Noh | ..................... | H01M 2/1077 |
| | | | | | 429/99 |
| 2014/0234688 A1 | * | 8/2014 | Cha | ...................... | H01M 10/625 |
| | | | | | 429/120 |
| 2015/0017502 A1 | * | 1/2015 | Brenner | .................. | F16B 3/005 |
| | | | | | 429/99 |

FOREIGN PATENT DOCUMENTS

| WO | 2011134697 A1 | 11/2011 |
| WO | 2012104394 A1 | 8/2012 |

* cited by examiner

*Primary Examiner* — Scott J Chmielecki
(74) *Attorney, Agent, or Firm* — David B. Kelley; Brooks Kushman P.C.

(57) ABSTRACT

A traction battery assembly includes a base plate and a plurality of prismatic cells stacked in an array on the base plate. A spacer assembly surrounds and is in contact with at least a portion of each of the cells. Each of the spacers assemblies include a pair of brackets having retaining tabs configured to extend over and retain a top portion of the cell opposite the base plate and anchoring tabs extending away from a base of the array. A clamp is disposed along the array and is configured to anchor the anchoring tabs to the base.

21 Claims, 5 Drawing Sheets

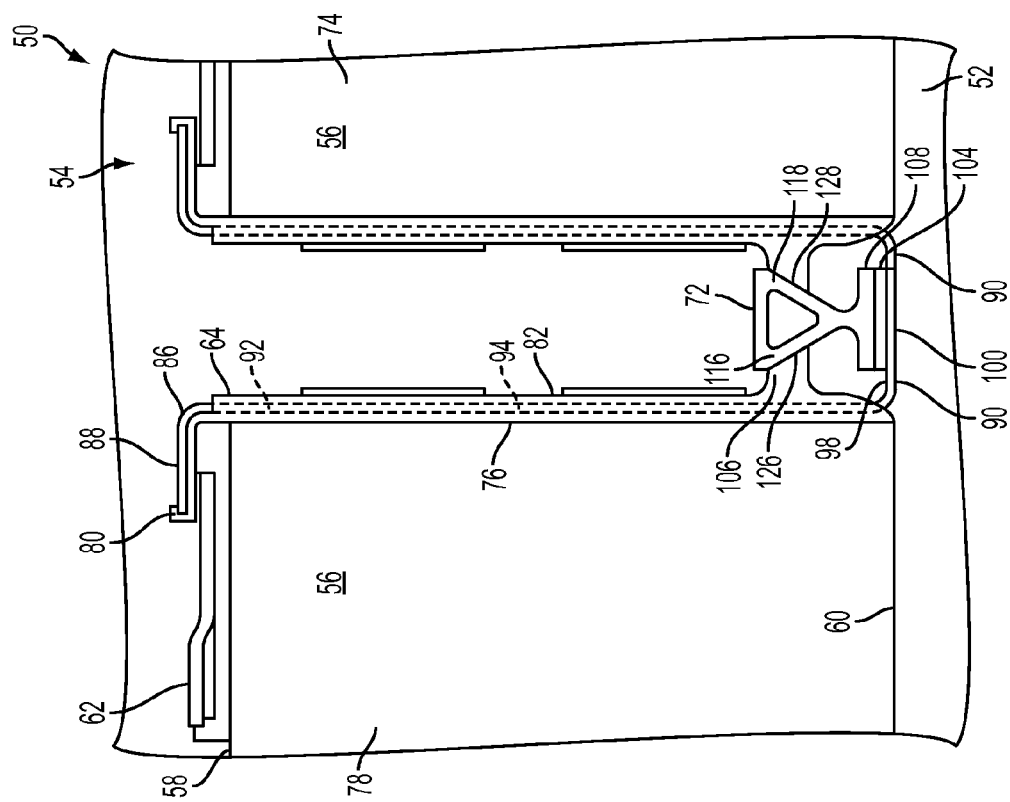
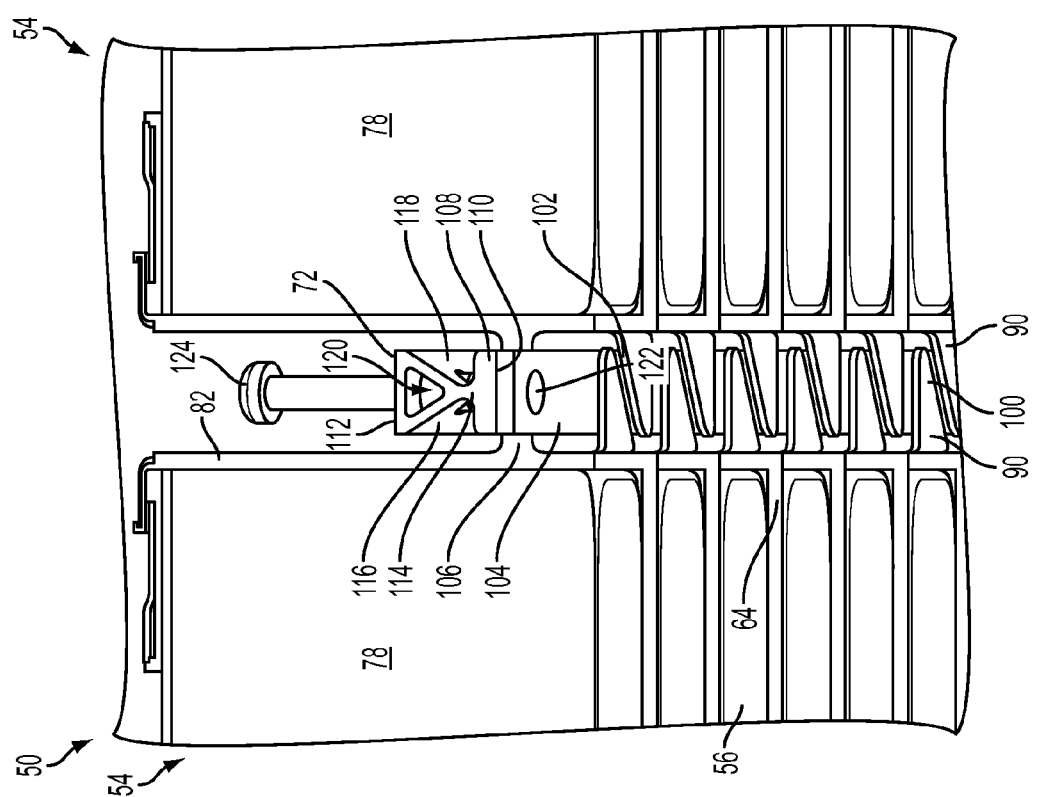

TRACTION BATTERY ASSEMBLY

TECHNICAL FIELD

This disclosure relates to traction battery assemblies for use in an electric or hybrid vehicle.

BACKGROUND

Vehicles such as battery-electric vehicles (BEVs), plug-in hybrid electric vehicles (PHEVs) and full hybrid-electric vehicles (FHEVs) contain a traction battery assembly to act as an energy source for the vehicle. The traction battery may include components and systems to assist in managing vehicle performance and operations. The traction battery may also include high voltage components.

SUMMARY

In one embodiment, a traction battery assembly includes a base plate and a plurality of prismatic cells stacked in an array on the base plate. A plurality of spacer assemblies each surround and are in contact with at least a portion of one of the cells. Each spacer assembly includes a pair of brackets having retaining tabs configured to extend over and retain a top portion of the cell opposite the base plate and anchoring tabs extending away from a base of the array. The clamp is disposed along the array and configured to anchor the anchoring tabs to the base plate.

In another embodiment, a traction battery assembly includes a base plate and a plurality of cell assemblies stacked in an array. Each of the assemblies including a prismatic cell and a spacer wrapped around at least three sides of the cell. The spacers include hooking portions configured to engage opposite ends of a terminal side of the cell and clamped portions extending away from the array and configured to be clamped to the base plate.

In yet another embodiment, a traction battery assembly includes a base plate and a plurality of cell assemblies stacked in an array. Each assembly includes a cell spacer surrounding at least a portion of the cell and having retaining tabs configured to engage opposite ends of the top side of the cell and anchoring tabs extending away from the array and configured to be clamped to the base plate.

BRIEF DESCRIPTION OF THE DRAWINGS

FIG. 6 illustrates a bottom perspective view of the battery assembly with the base plate omitted.

FIG. 7 illustrates a front view of the battery assembly with the endplates omitted.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
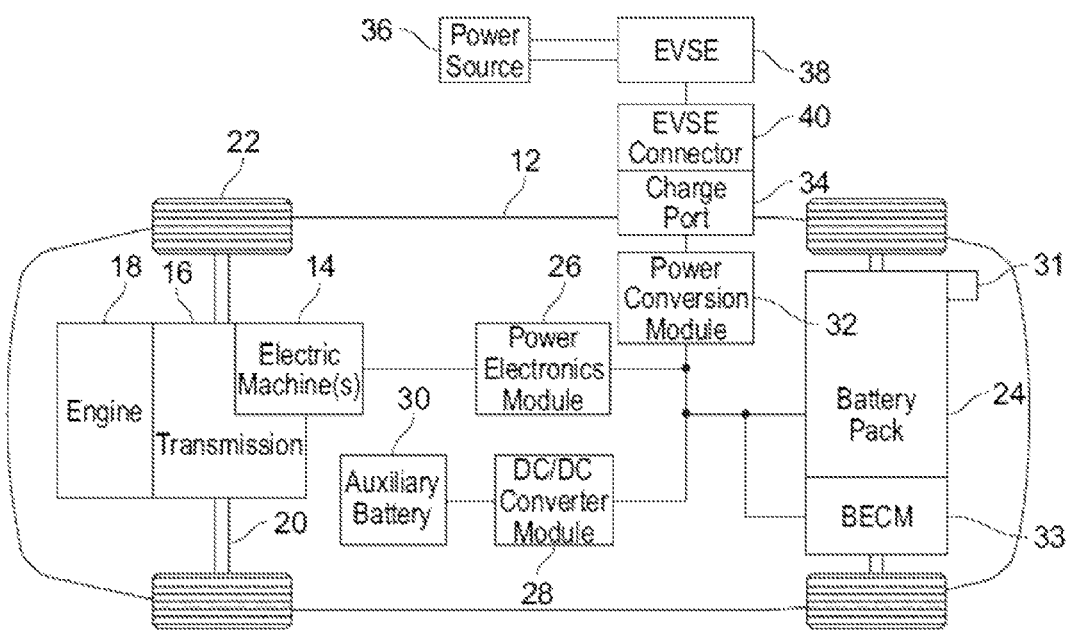
FIG. 1 depicts a schematic of a typical plug-in hybrid-electric vehicle.

FIG. 1 depicts a schematic of a typical plug-in hybrid-electric vehicle (PHEV). The vehicle 12 includes one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. In a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12 V battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic or pouch cell, may include electrochemical cells that convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

Figure 2:
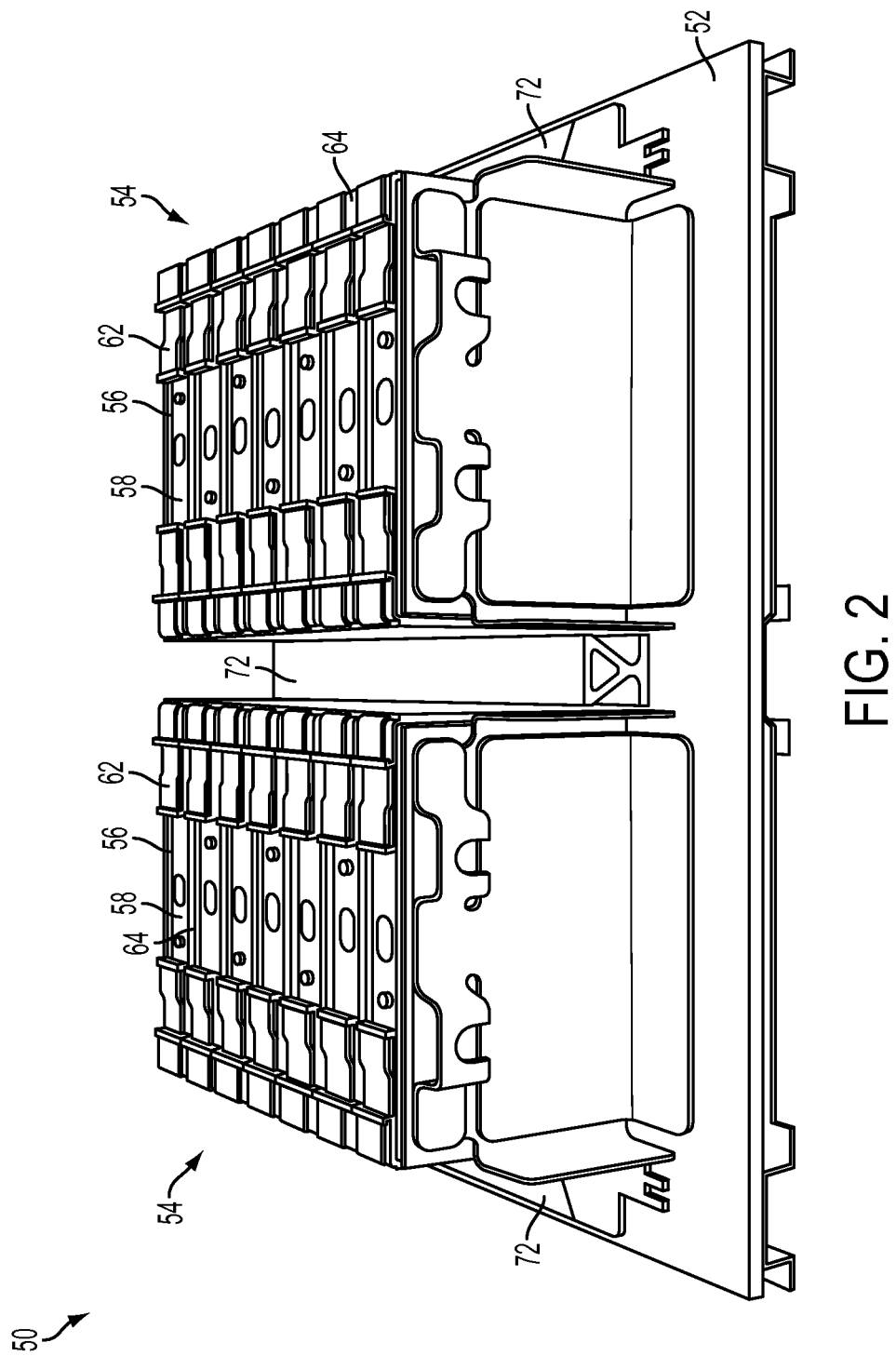
FIG. 2 illustrates a perspective view of a traction battery assembly.

Referring to FIG. 2, a traction battery assembly 50 is shown. The traction battery assembly 50 includes a base plate 52. The base plate 52 may be a thermal plate for heating or cooling the traction battery assembly 50. The base plate 52 supports two battery arrays 54. Each array 54 includes a plurality of battery cells 56. Each battery cells 56 may be a prismatic cell having a bottom portion that is disposed against the base plate 52 and a top portion 58 that is opposite the base plate 52. Each cell 56 includes at least one terminal 62 disposed on the top portion 58. The terminals 62 are electrically connect in series or parallel by busbars (not shown) and are electrically connected to the high voltage bussing. Each cell 56 has a corresponding cell spacer 64 that surrounds and is in contact with at least a portion of the corresponding cell. Each array 54 also includes bracketry to secure the cells 56, spacer 64 and other components in place. The bracketry may provide compression to the battery array 54. The battery arrays 54 are secured to the base plate 52 by a clamping mechanism 72 disposed along the array and configured to anchor the array to the base 52. The clamping mechanism 72 may be a clamping bar that engages with a portion of the array 54 to secure the array 54 to the base 52.

Figure 3:
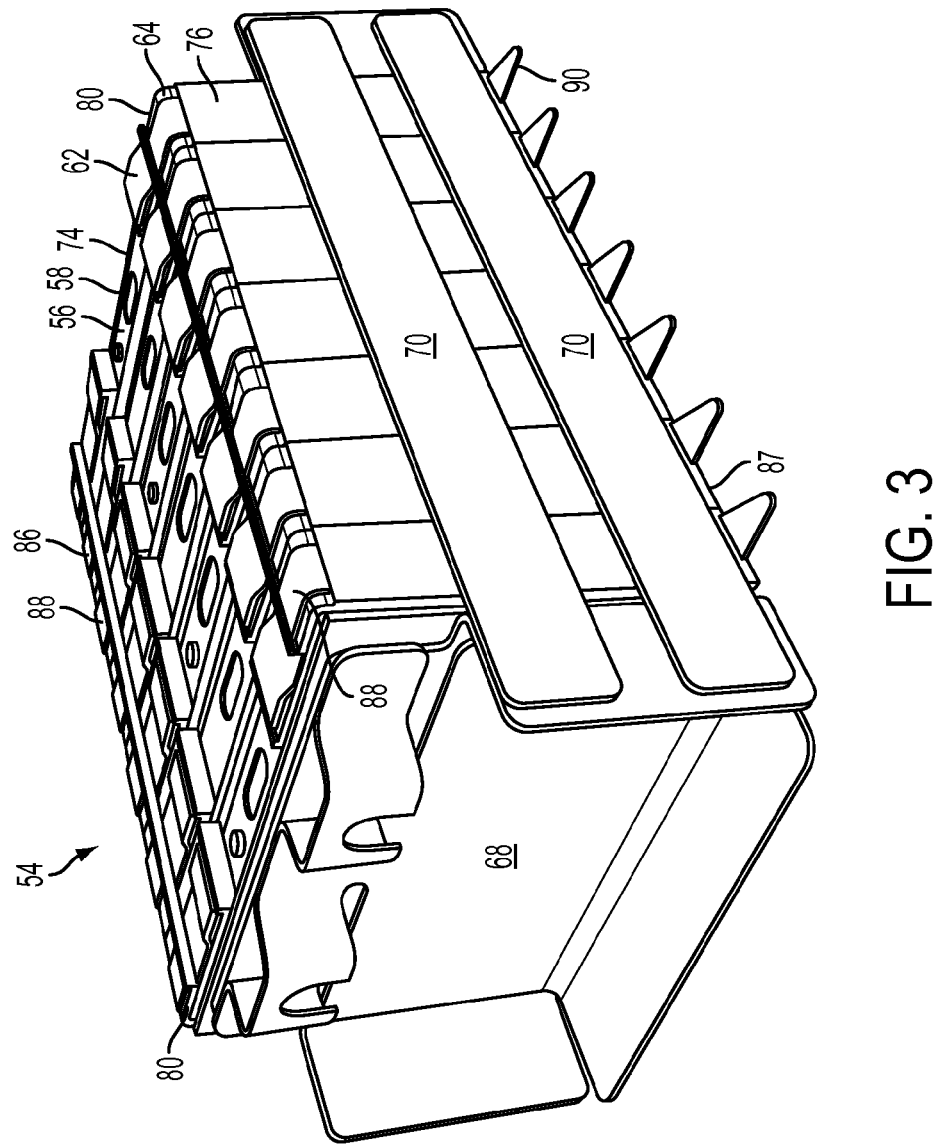
FIG. 3 illustrates a perspective view of a battery array.

FIG. 3 illustrates a battery array 54. The battery array 54 includes a plurality of stacked battery cell assemblies 74. Each cell assembly 74 includes a cell 56, such as a prismatic cell. The cell 56 includes a terminal side or top portion 58. At least one terminal 62 is disposed on the terminal side 58. A spacer 64 is in contact with and wraps around at least three sides of the cell 56. The spacer 64 may also include two curved portions 80 that are disposed over opposite ends of the terminal side 58 of the cell 56. A pair of Z-brackets 86 are disposed on opposing side portions 76 of the cells 56. Each Z-brackets 86 includes a retaining tab 88 configured to engage a terminal side 58 of the cell and an anchoring tab 90 that extends away from a base 87 of the array 54 and is configured to be clamped to the base plate 52. Each array 54 also includes bracketry to secure the cells 56, spacer 64 and other components in place. The bracketry may include end plates 68 and straps 70.

Figure 4:
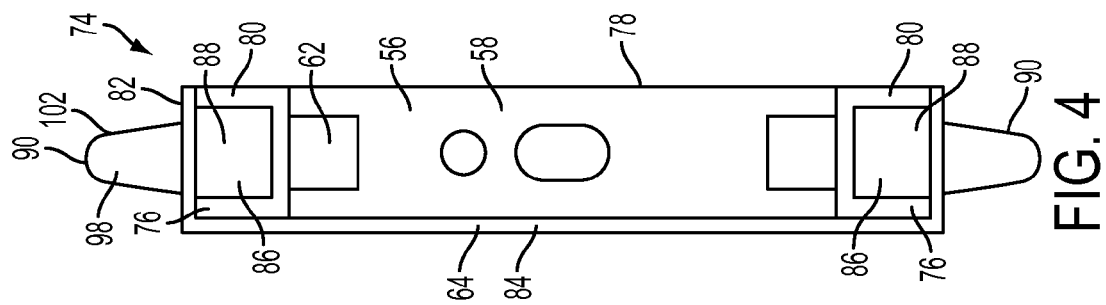
FIG. 4 illustrates a top view of a battery cell assembly.
Figure 5B:
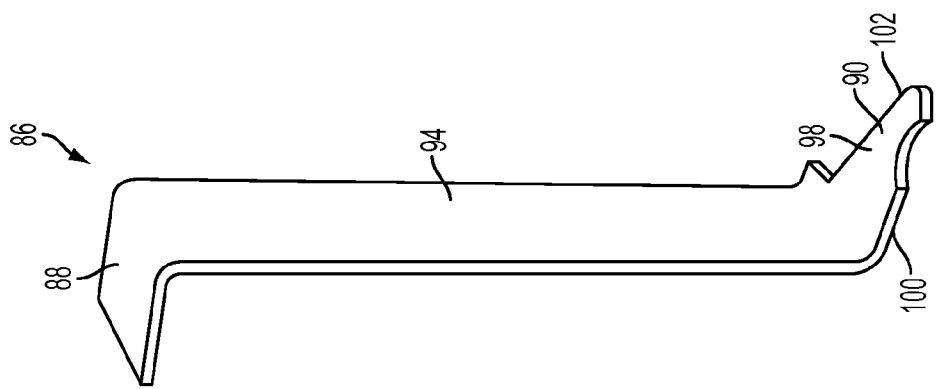
FIG. 5B illustrates a perspective view of a Z-bracket.
Figure 5A:
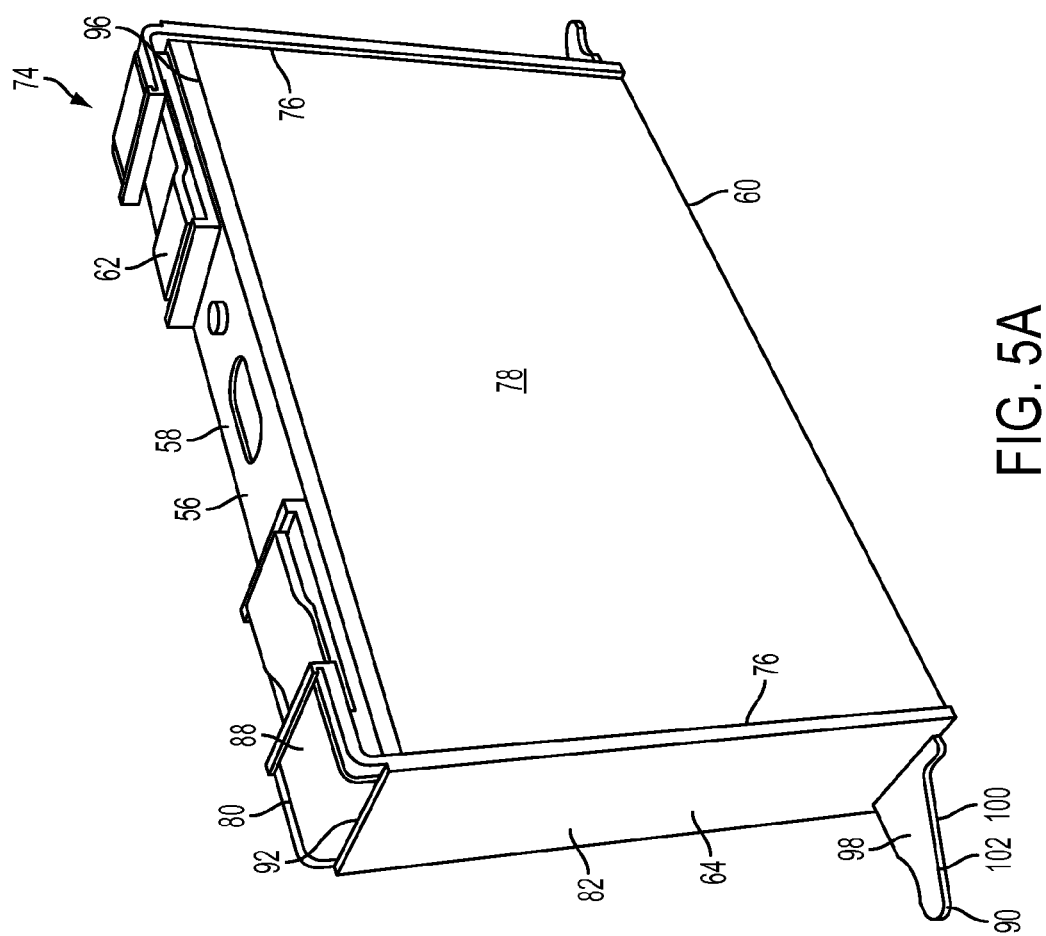
FIG. 5A illustrates a perspective view of the battery cell assembly.

FIGS. 4, 5A and 5B illustrate a cell assembly 74. A plurality of cell assemblies 74 may be stacked to form an array 54. Each cell assembly 74 includes a cell 56, such as a prismatic cell that includes a bottom portion 60, a top portion 58, side portions 76 and opposing contact portions 78. The bottom portion 60 is the portion in contact with the base plate 52. At least one terminal 62 is disposed on the top portion 58. A dielectric wrapping 96 may be disposed around the cell 56. The dielectric wrapping 96 electrically isolates the cell to prevent unwanted electric discharge.

A spacer 64 surrounds and is in contact with at least a portion of the cell 56. For example, the spacer 64 may wrap around the two opposing side portions 76 and around one contact portion 78. The spacer 64 has a minor side 82 that is disposed over the side portion 76 and a major side 84 that is disposed over the contact portion 78. The spacer 64 may also include two curved portions 80 that are disposed over opposite ends of the top portion 58 of the cell 56. If a wrapping 96 is included, the spacer 64 would be disposed around the wrapping such the wrapping is sandwiched between the spacer 64 and the cell outer surface.

A pair of Z-bracket 86 is adjacent to opposing side portions 76. The spacer 64 may include a bracket channel 92 disposed within each minor side 82. Each Z-bracket 86 may be disposed within one of the bracket channels 92 if provided. Each Z-bracket 86 includes a retaining tab 88 configured to engage a top portion 58 of the cell 56 and an anchoring tab 90 that extends away from the array 54 and is configured to be clamped to the base plate 52. The anchoring tab 90 includes a top side 98 and a bottom side 100. The top side 98 is configured to be adjacent to the bar 72 and the bottom side 100 is configured to be adjacent to the base plate 52. The anchoring tab 90 may include an angled side 102. The angled side 102 of one anchoring tab 90 may cooperate with the angled side 102 of another anchoring tab 90 to provide compact nesting of the anchoring tabs on to the base plate 52. A standing portion or linking bar 94 interconnects the retaining tab 88 and anchoring tab 90 defining a "Z" shaped bracket. The retaining tab 88 and the anchoring tab 90 extend away from the standing portion 94 in opposite directions.

The spacer 64 and Z-bracket 86 may be formed of different materials. For example, the Z-brackets 86 may be metallic and the spacer 64 may be plastic. The spacer 64 may be an injected molded plastic that is formed around prefabricated Z-brackets. The spacer 64 and Z-bracket 86 may also be formed of the same material. Alternatively, the Z-brackets 86 may be omitted and the spacer 64 may include the retaining tabs 88 and the anchoring tabs 90, which are integrally formed.

Referring to FIG. 6, a bottom perspective view of the battery assembly 50 is shown. The battery assembly 50 is shown with the base plate 52 and endplate 68 omitted to illustrate the details of the bottom portion of the array 54. The battery assembly 50 includes a pair of adjacent arrays 54. Each array includes a plurality of cells 56 and a plurality of cell spacers 64 that are stacked and secured by endplates. Each spacer includes an anchoring tab 90. Each anchoring tab 90 includes a top side 98 and a bottom side 100. Each anchoring tab 90 also includes an angled portion 102. The angled portion 102 of the first array cooperates with the angled portion 102 of the second array such that the angled portions are adjacent to one another to allow for compact nesting of the anchoring tabs 90. The anchoring tabs 90 are secured to the base place (not shown) by a bar 72, such as a Y-bar. An optional compression element 104 may be provided between the bar 72 and the top 98 of the anchoring tabs 90. The compression element 104 provides a more uniform pressure on the anchoring tabs 90 and compensates for variations in anchoring tab heights with respect to the base.

The Y-bar 72 includes a base 108. The base 108 includes a clamping surface 110. The clamping surface 110 is the portion of the Y-bar 72 that presses against the compression element 104. The compression element 104 transfers the clamping force from the bar 72 to a top surface 98 of the anchoring tabs 90. Alternatively, the compression element 104 may be omitted. In this configuration the clamping surface 110 presses directly against the top surface 98 of the anchoring tabs 90. The Y-bar 72 also includes a top portion 112 that is connected to the base 108 by a leg 114. The top portion 112 includes a first slanted surface 116 and a second slanted surface 118 and resembles an upside down triangle. The first and second slanted surfaces 116, 118 join at a top portion of the leg 114. The top portion 112 also includes a hollow middle 120. The Y-bar 72 and compression element 104 may include fastener holes 122. The base plate 52 includes similar fastener holes that align with holes 122. The fastener holes 122 receive the fasteners 124. The fasteners 124 secure the Y-bar 72 to the base plate 52. The fasteners 124 and fastener holes 122 may be provided at select locations along the Y-bar 72.

Each spacer 64 may also include a side tab 106. The side tab 106 projects from a minor side 82 of the spacer 64 and extends away from the array 54. The side tabs 106 projects in the same direction as the anchoring tabs 90. The side tabs 106 engage with a portion of the clamping bar 72 and provide an additional connection between the spacer 64 and the bar 72 to further secure the array 54 to the base plate 52.

Referring to FIG. 7, a front view of the battery assembly 50 is shown. The endplates 68 are omitted for clarity. The battery assembly 50 includes a pair of adjacent arrays 54. Each array 54 includes a plurality of cell assemblies 74. Each cell assembly 74 includes a cell 56, such as a prismatic cell that includes a bottom portion 60, a top portion 58, side portions 76 and opposing contact portions 78. The bottom portion 60 is the portion in contact with the base plate 52. At least one terminal 62 is disposed on the top portion 58.

A spacer 64 surrounds and is in contact with at least a portion of the cell 56. The spacer 64 may also include two curved portions 80 that are disposed over opposite ends of the top portion 58 of the cell 56. A Z-bracket 86 is adjacent to one of the side portions 76. The spacer 64 may include a bracket channel 92 disposed within each minor side 82. The standing portion 94 of each Z-bracket 86 may be disposed within the bracket channel 92 if provided. Each Z-bracket 86 includes a retaining tab 88 configured to engage a top portion 58 of the cell 56 and an anchoring tab 90 that extends away from the array 54 and is configured to be clamped to the base plate 52. The anchoring tab 90 includes a top side 98 and a bottom side 100. The top side 98 is configured to be adjacent to the bar 72 and the bottom side 100 is configured to be adjacent to the base plate 52. The retaining tab 88 and the anchoring tab 90 extend away from the standing portion 94 in opposite directions.

The battery assembly 50 includes at least one clamping bar 72 disposed over the anchoring tabs 90 to secure the tabs to the array 54. The clamping bar 72 may be a Y-bar. The Y-bar 72 includes a base 108. The base 108 includes a clamping surface 110. The Y-bar 72 also includes a top portion 112 that is connected to the base 108 by a leg 114. The top portion 112 includes a first slanted surface 116 and a second slanted surface 118 and resembles an upside down triangle. The first and second slanted surfaces 116, 118 join at a top portion of the leg 114.

Each spacer 64 may also include a side tab 106. The side tab 106 projects from a minor side 82 of the spacer 64 towards the bar 72. Each side tab 106 includes a tip portion 126 that interfaces with the bar 72. The tip portion 126 includes an angled surface 128 that engages with either the first or second slanted side 116, 118 to further secure the cell spacer 64 to the base plate. 52.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A traction battery assembly comprising:
a base plate;

a plurality of prismatic cells stacked in an array on the base plate, each of the cells including opposing major sides and minor sides extending therebetween;

a plurality of spacer assemblies interleaved with the cells such that a portion of each of the spacers is disposed between major sides of adjacent pairs of the cells, each of the spacer assemblies surrounding and in contact with at least a portion of one of the cells, and each including a pair of brackets having retaining tabs configured to extend over and retain a top portion of the cell opposite the base plate and anchoring tabs extending away from a base of the array; and a clamp disposed along the array and configured to anchor the anchoring tabs to the base plate.

2. The traction battery assembly of claim 1 wherein each of the brackets is a Z-bracket.

3. The traction battery assembly of claim 1 wherein the clamp includes a bar disposed over the anchoring tabs and secured to the base plate.

4. The traction battery assembly of claim 3 wherein the clamp further includes a compression element sandwiched between the anchoring tabs and the bar.

5. The traction battery assembly of claim 1 wherein each of the spacer assemblies includes a side tab configured to cooperate with the clamp to further facilitate anchoring of the array to the base plate.

6. The traction battery assembly of claim 5 wherein the clamp includes a Y-bar disposed over the anchoring tabs and engaged with the side tab to secure the array to the base plate.

7. The traction battery assembly of claim 2 wherein each of the spacer assemblies includes a pair of opposing bracket channels configured to receive one of the Z-brackets therein.

8. The traction battery assembly of claim 1 wherein the base plate is a thermal plate configured to provide heating or cooling to the cells.

9. The traction battery assembly of claim 2 wherein the Z-brackets each include a standing portion interconnected between the retaining tabs and the anchoring tabs, and wherein the standing portions of the pair of Z-brackets are disposed along opposing minor sides of the spacer assembly.

10. The traction battery assembly of claim 1 wherein each of the spacer assemblies includes a pair of opposing minor sides interconnected by a major side disposed between adjacent pairs of the cells, and wherein the brackets are disposed in the minor sides.

11. A traction battery assembly comprising:
a base plate;
cells stacked in an array; and
spacers including a body having a portion interleaved with the cells and wrapped around at least three sides of a corresponding one of the cells, each body having a pair of hooking portions engaging opposite ends of a terminal side of the corresponding cell and clamped portions extending away from the array and configured to be clamped to the base plate.

12. The traction battery assembly of claim 11 further comprising a bar disposed along the array and disposed over the clamped portions to secure the clamped portions to the base plate.

13. The traction battery assembly of claim 11 further comprising a dielectric wrapping around each of the cells and disposed between the cell and corresponding spacer.

14. The traction battery assembly of claim 11 wherein the spacer comprises a different material than the hooking and clamped portions.

15. The traction battery assembly of claim 12 wherein each of the spacers includes a side tab configured to cooperate with the bar to further secure the array to the base plate.

16. The traction battery assembly of claim 11 wherein each of the spacers further includes a pair of brackets each extending along opposing minor sides of the cells, and wherein each of the brackets includes one of the hooking portions and one of the clamped portions.

17. A traction battery assembly comprising:
a base plate; and
a plurality of cell assemblies stacked in an array, each assembly including a cell, and a spacer having a portion disposed against a major side of the cell, retaining tabs configured to engage opposite ends of a terminal side of the cell, and anchoring tabs extending away from the array and configured to be clamped to the base plate.

18. The traction battery assembly of claim 17 wherein the spacer further includes a pair of linking bars each interconnecting one of the retaining tabs to one of the anchoring tabs.

19. The traction battery assembly of claim 18 wherein the spacer defines a pair of opposing channels each configured to receive one of the linking bars therein.

20. The traction battery assembly of claim 17 further comprising a Y-bar disposed over the anchoring tabs, wherein the spacer includes a side tab configured to engage a slanted side on the Y-bar to further secure the array to the base plate.

21. The traction battery assembly of claim 10 wherein each of the minor sides of the spacer assemblies are disposed against a corresponding one of the minor sides of the cells.

* * * * *